United States Patent [19]
Stavrev et al.

[11] Patent Number: 5,353,708
[45] Date of Patent: Oct. 11, 1994

[54] METHOD FOR PRODUCTION OF ULTRADISPERSED DIAMOND

[76] Inventors: Starvri Y. Stavrev, JK Mladost 1, Bl. 9, Entr. A, App 4; Slavcho B. Lazarov, JK Lyulin Bl. 135; Khristo L. Stoev, Planinetz #30; Lyudmil G. Markov, JK Druzba 2, Bl. 211, Entr. A, App 28; Valeri I. Ivanov, Bl. 309, Entr. A, all of Sofia, Bulgaria

[21] Appl. No.: 790,635

[22] Filed: Nov. 8, 1991

[30] Foreign Application Priority Data

Nov. 9, 1990 [BG] Bulgaria .................................. 93185

[51] Int. Cl.$^5$ ................................................ F42B 3/00
[52] U.S. Cl. ...................................... 102/301; 428/408
[58] Field of Search ........................ 102/301; 420/408

[56] References Cited

U.S. PATENT DOCUMENTS

| | | | |
|---|---|---|---|
| 2,933,653 | 4/1960 | Carter | 317/80 |
| 3,023,462 | 3/1962 | Taylor et al. | 18/59.3 |
| 4,552,742 | 11/1985 | Mayer | 102/201 X |
| 4,905,601 | 3/1990 | Gabriel et al. | 102/307 |

OTHER PUBLICATIONS

V. M. Titov, V. F. Anisichkin, 1. Yu. Mal kov; Lavrentyev Institute of Hydrodynamics Novosibirsk, 630090, USSR; *Synthesis of Ultrafine Diamonds in Detonation Waves,* paper No. 196.

*Primary Examiner*—Peter A. Nelson
*Attorney, Agent, or Firm*—Fred A. Keire; George B. Snyder; William J. Spatz

[57] ABSTRACT

The invention relates to a method of production of ultradispersed diamond which can be used for the production of abrasive materials, more particularly, this method relates to production of fine diamond powder by explosive means.

5 Claims, No Drawings

METHOD FOR PRODUCTION OF ULTRADISPERSED DIAMOND

BACKGROUND FOR THE INVENTION

A method is known for production of ultradispersed diamond that includes decomposition of an explosive as a result of a detonation process in an environment containing an inert gas, and then for synthesis of it in the zone of the explosive reaction. This disclosure is found in V. M. Titov, V. F. Anisinchkin and I. Yu. Malikov, *Synthesis of Ultradispersed Diamonds in Explosive Waves* (in Bulgarian), Report No. 196, Lavrentiyev Institute for Hydrodynamics, Novosibirsk, formerly in USSR.

The shortcomings of the known method are as follow: the need for the use of an inert gas, unsatisfactory dynamic parameters of the detonation process, which account for thermal and pressure loading and give unacceptable information on the completeness and rate of the explosive reaction; and the impossibility of satisfactorily controlling the explosive reaction, which degrades the quality of the detonation process.

BRIEF DESCRIPTION OF THE INVENTION

A method has been discovered which can be used in the production of abrasive materials. With it, the dynamic indices of the detonation process are improved, and the possibility of controlling the explosive reaction that takes place in an axially confined space is achieved. The method involves decomposition of the explosive, containing carbon from which the diamond results. The explosive may be a single explosive or a combination of explosives or mixtures of explosives with a negative oxygen balance. As a result of the detonation process ultradispersed diamond is obtained.

Before decomposition by detonation occurs, the ambient pressure is at a normal environment pressure found at that location, or a low-vacuum environment, i.e. below normal atmospheric pressure. The explosion is initiated and the detonation process occurs in an explosively unrelieved, confined space. The charge is located in a hard shell with radial-axial control of the detonation process from the center to the periphery, and in a soft shell with radial-axial control from the periphery to the center.

DETAILED DESCRIPTION OF THE PRESENT INVENTION AND EMBODIMENTS THEREOF

The present invention relates to an improved method of producing an ultradispersed diamond without the use of an inert gas with specified dynamic parameters and the improved method for controlling the explosive reaction. By ultradispersed diamond it is meant diamond particles of less than 5 microns in diameter but more typically of about 100 Å or less, e.g. 80 Å average particle diameter. The goal is attained by a method of producing ultradispersed diamond in which a charge of an explosive containing carbon or a combination of explosives also containing carbon with a negative oxygen balance, i.e. stoichiometrically insufficient amount of oxygen to complete the explosion is initiated and decomposition of the charge is effected as a result of the detonation process, which proceeds from an initiation stage in a normal pressure environment or a low-vacuum environment at ambient temperature conditions. The detonation process proceeds in an explosively unrelieved, confined space. The explosives are located in a solid shell, e.g. autoclave with radial-axial control of the detonation process from the center of the charge to its periphery, and in a soft shell with radialaxial control from the periphery of the charge to its center. A typical charge is from about 400 grams to about 800 grams, preferably 500 grams to 600 grams for a cylindrical space of about 1.2 meters diameter by 1.8 meters length.

The advantages of the method are that the method does not use an inert gas, the dynamic parameters ratio of charge weight to space of may be varied, water may be used instead of inert gas (sufficient to cover the charge), the confined space increases the dynamic indices of the explosive reaction, such as when using water and hence the quality of the detonation process. Using water has also the advantage that it acts as a heat sink and prevents oxidation of the diamond particles. In the absence of an inert gas, the process dispenses of a large amount of preparatory work and of the need for equipment and materials. With proper selection of the parameters of the confined space such as of explosives, their relationship and placement one to another, and control of the explosive reaction such as by use of water, the end results specified in advance are realized, i.e. predetermined particle size and distribution are obtained. Thus from a charge of 500 grams to 600 grams of explosives about 200 to 250 carats of diamond powder of an average size of about 80 Å is obtained. Larger or smaller particle sizes are obtained by varying the ratio of explosives, their position in the center or periphery, mixing of explosives and the like.

A sample implementation of the method, which does not exhaust the scope of this application is as follows.

Upon initiation by a type EDMN-"0" electric detonator, a combined charge of two explosives, trinitrotoluene and hexogen with oxygen balances of 74.0 and 21.6, respectively, decompose in an initial environment at a barometric pressure of 715 mm Hg.

The detonation process proceeds in an explosively unrelieved, confined space when the charge is placed in a hard shell e.g. autoclave. For radial-axial control of the detonation process, the two explosives are positioned in the following fashion: the trinitrotoluene is at the center and the hexogen is placed about the periphery and in the top layer of the cylindrical charge.

Ultradispersed diamond is obtained by this method with the combined charge in the free state or if it is located in a soft shell then from exploding the charge from the periphery inwardly.

Other explosives which may be used are those which have a stoichiometric oxygen deficiency to combust all carbon and other combustibles in the explosive or the space in which explosion takes place such that no excess oxygen can burn up the obtained diamond, taking into account also the residual oxygen present in the autoclave including the space not occupied by the explosive, e.g. by water on air.

We claim:

1. A method of producing ultradispersed diamond particles, which involves decomposition of an explosive as a result of a detonation process, the process comprising the steps of exploding in a confined space, at least one organic explosive or a mixture of organic explosives surrounded by water, wherein the organic explosive or explosives have a stoichiometrically negative oxygen balance, which explosion is initiated, in a normal environment, or in a low-vacuum environment, said confined space being an explosively unrelieved, confined space when the explosive is located in a hard shell with radial-axial control of the detonation process from its center to its periphery or in a soft shell with radial-axial control from the periphery to its center, purifying and recovering ultradispersed diamond particles.

2. The process as defined in claim 1 wherein 500 grams to 600 grams of explosive are exploded in a space of 1.2 meters diameter by 1.8 meters length.

3. The process as defined in claim 1 wherein said confined space, beyond the water which surrounds the organic explosive or explosives, is occupied by air.

4. In a process for producing ultradispersed diamond particles by explosive force, the improvement comprising:

exploding in a confined space at least one organic explosive surrounded by water in a normal or low pressure atmosphere, said at least one organic explosive having an oxygen deficiency sufficient to form diamond particles in said confined space and recovering diamond particles from a residue of said at least one organic explosive.

5. The process as defined in claim 4 wherein at least two organic explosives are used, and wherein one of said organic explosives is trinitrotoluene and the other is hexogen.

* * * * *